Patented June 28, 1927.

1,634,155

UNITED STATES PATENT OFFICE.

ELBERT E. McCARTY, CLARENCE C. DICUS, AND THEODORE F. LANGKOP, OF BUNCETON, MISSOURI, ASSIGNORS TO OVIE E. BRADLEY, OF ELMO, MISSOURI.

HOG CONDITIONER.

No Drawing. Application filed October 12, 1923. Serial No. 668,194.

The present invention relates to a hog conditioner, that is to say, a medicine to be fed to hogs when they are in a run-down condition, in order to strengthen them, give them better vitality, and hence greater ability to withstand the diseases to which hogs are subject, and also to make them grow faster, and to put them generally into better condition.

One of the components of the composition is cannel coal, this being preferably ground to a very fine powder, and being preferably ground to an impalpable powder.

The parts are by weight, and the following table gives the preferred composition of the dry conditioner in a form ready for use:

| | Parts |
|---|---|
| Lime | 5 |
| Powdered Areca nuts (betel nuts) | 4 |
| Powdered sulphur | 4 |
| Sodium bicarbonate | 4 |
| Common salt | 7 |
| Glauber's salt | 8 |
| Copperas (ferrous sulfate crystals powdered) | 4 |
| Cannel coal | 164 |

The major component, as above indicated, is cannel coal, and the only treatment to which this material has to be subjected is grinding, and it preferably is ground to a very fine powder. Our researches have indicated that when the powdered cannel coal or the complete formula as above described is ingested by the hog, the gastric juice of the hog's stomach acts upon the coal, and dissolves certain constituents therefrom, including a considerable amount of the iron and sulphur contained in the coal. This kind of coal is usually rather rich in iron and sulphur. It is found that the gastric juice of the hog's stomach is able to dissolve a substantial part of the cannel coal, and the portion which is not soluble is left in a very fine and somewhat porous condition, so that it does not in any way interfere with the hog's digestion.

The cannel coal can be used alone, but as above stated it is preferably employed in the complete formula. The Areca nuts act as a vermifuge, and hence are able to act as a conditioner for hogs.

The mixture can be given to the hogs by being mixed with their food, for example, the conditioner can be mixed with a mash of meal, or the like, which it is to be fed to the hog.

We prefer ordinarily in using this medicine to mix up with a mash of meal, bran, or the like, two ounces of the mixture as above referred to or two ounces of the cannel coal alone, and then feed this mash to a hog. It is also advisable to repeat this dose at intervals of, say, two days, until six doses have been given. In case the hog is in extremely bad shape, as where symptoms of hog cholera have appeared, the dose can be increased up to five ounces and can be repeated each day for two weeks, after which it could be repeated again every two or three days for another four or five doses. Also the medicine can be given alone, i. e. without the food.

We claim:

A compound for the treatment of necrotic conditions in animals comprising Areca nuts, sulphur, sodium bicarbonate, lime, common salt, Glauber's salt and cannel coal, the said constituents being in powdered form, the proportions of the Areca nuts, sulphur and sodium bicarbonate being approximately the same, the proportions of the lime, common salt and Glauber's salt each being slightly greater than the proportions of the Areca nuts, sulphur and sodium bicarbonate, and the proportion of the cannel coal being materially greater than the combined proportions of all of the other constituents of the compound.

In testimony whereof we affix our signatures.

ELBERT E. McCARTY.
CLARENCE C. DICUS.
THEODORE F. LANGKOP.